Oct. 26, 1954  C. H. WALKER  2,692,791
SEALING STRIP FOR VENTILATOR WINDOWS
Filed March 22, 1952  3 Sheets-Sheet 1

INVENTOR.
CHARLES H. WALKER
BY
ATTORNEY

Oct. 26, 1954  C. H. WALKER  2,692,791
SEALING STRIP FOR VENTILATOR WINDOWS
Filed March 22, 1952  3 Sheets-Sheet 2

INVENTOR.
CHARLES H. WALKER
BY
ATTORNEY

Oct. 26, 1954

C. H. WALKER 2,692,791

SEALING STRIP FOR VENTILATOR WINDOWS

Filed March 22, 1952

INVENTOR.
CHARLES H. WALKER
BY
ATTORNEY

Patented Oct. 26, 1954

2,692,791

UNITED STATES PATENT OFFICE 2,692,791

SEALING STRIP FOR VENTILATOR WINDOWS

Charles Henry Walker, Novi Township, Oakland County, Mich.

Application March 22, 1952, Serial No. 277,929

12 Claims. (Cl. 296—44)

The present invention relates to a weather seal. In the particular embodiment here disclosed by way of example, the present invention is shown as adapted for use in sealing the clearance space between the bottom, top and inclined edge portions of a pivoted window and the corresponding portions of the window opening when the window is closed.

In automobile bodies pivoted windows are provided in a portion of the window openings and are widely utilized to permit ventilation of the automobile body by swinging said windows about pivots. In so swinging the pivoted window the portion of the window forward of the pivots is moved inwardly of the body and the portion of the window rearward of the pivots is moved outwardly of the body. To make possible such swinging movement of the window, it is necessary to provide a clearance space between the window opening and the pivoted window. In order to prevent rain, wind and dust from entering the car when the pivoted window is closed, it is necessary that means be provided for sealing this clearance space.

A conventional type of sealing member that has been used extensively for such sealing purposes consists of a molded rubber member mounted in a metal channel so shaped as to follow the contour of the framed portions of the glass panel of the pivoted window, and consisting primarily of a base from which integral flexible sealing lips or flanges, having one flat face, extend inwardly into the window opening and contact opposite side faces of the window channel or frame forward and rearward of the window pivots. Due to the fact that the front portion of the pivoted window swings outward when closing and that the rear portion of the pivoted window swings inward when closing, it is necessary, due to the thickness of the framed window panel, that the said sealing lips or flanges be placed off center, i. e. the extending sealing lips or flanges intended to seal the forward portion of the pivoted window are located on the outside side of the mounted base forward of the pivots and the extending sealing lips or flanges intended to seal the rear portion of the pivoted window are located on the inside side of the mounted base rearward of the pivots. So placed the sealing lips or flanges contact opposite faces of the glass panel frame or channel when the window is closed to effect a seal. Due to the inherent design of this type of sealing member, considerable manual effort is required to close the window and cause the sealing lips or flanges to become effective.

Due to the necessary design and bulkiness and necessary method of manufacturing this sealing member, it is ill fitting and does not provide a satisfactory, effective weather-tight seal when the window is closed. Due to the necessary design of this conventional type of sealing member, it must be molded which is a time-consuming and costly procedure. Furthermore, due to the opposite directional movement of the left and right pivoted windows, a separate mold is necessary to produce each different type and shape of sealing member required. Due to the various models and large quantities of automotive vehicles produced, it is necessary to maintain a large number of costly molds resulting in a substantial investment on the part of the manufacturer.

As distinguished from such conventional sealing members the present invention provides a new and improved weather-tight sealing of the clearance space between the pivoted window and the window opening by contact with the periphery of the window frame or channel when the window is closed.

In its preferred embodiment here disclosed by way of example, the weather seal of the present invention is formed of a resilient material and has a cross-sectional contour such that within the allowed production limits, it conforms readily to the variations between the window frame and the window opening. The weather seal at all times is readily responsive to the displacing pressures exerted thereon by the periphery of the pivoted window frame to effect the desired weather-tight seal between the parts. The weather seal of the present invention, acting as it does when contacted by the periphery of the window channel or frame, requires no extending sealing lips or flanges which overlie the sides of the window channel or frame. Thus, the present invention provides a neat, symmetrical, trim line between the window channel or frame and both the interior and exterior moldings which case the window opening.

In one embodiment of the invention here disclosed, the weather seal consists of a resilient sealing member of continuous cross sectional form, primary parts of which are a base for mounting and a sealing bead. The sealing bead in a preferred form is substantially cross-like in cross sectional contour and is connected to the top face of the base by a flexible web-like neck at the center line of the transverse face of the base.

In modern automobile bodies, it is a common practice to provide front window openings in the doors and to provide rear window openings either in the doors or in the vehicle body. A window is pivoted in such openings for movement about a substantially vertical axis so that when closed it can lie in alignment with a sliding window panel which may occupy the remainder of the opening. When swung about its pivot, such pivoted window will occupy positions at various angles to the plane of the window opening to act as a ventilator. In some instances, the pivoted window may fill the entire window opening.

Such automobile ventilating windows are provided with molded resilient sealing members of the conventional type heretofore described which extend part way or entirely around the window opening and have lips or flanges having one flat face which overlies and seats against one face of the window channel or frame when the window is closed. To secure a positive sealing effect when the window is in closed position, it is necessary to press the window angularly against the said lip or flange portions of the said sealing member. A sufficient pressure to achieve a sealing effect thus exerted between the window frame or channel and the lip or flange portions of the sealing member frequently causes displacement of the sealing contact at some point and destroys the effectiveness of the weather seal.

Another disadvantage inherent in the conventional construction is that the extending sealing lips or flanges extend onto and cover part of the face of the bottom section of the pivoted window frame or channel when the window is closed. This makes it impossible to mount the conventional locking handle on the face of the window frame or channel in the most effective position, and this necessitates the use of a mounting bracket attached to the window frame and to which the locking handle is fastened, thereby raising the position of the locking handle above the top edge of the sealing flange to avoid interference. The necessary construction for so mounting the locking handle adds considerably to the cost of manufacturing such pivoted windows.

The conventional locking handle engages either a latch plate provided on the garnish molding or engages one face of the upright divider bar conventionally provided for guiding the sliding window and contacting one side of the pivoted window and makes possible the locking of the pivoted window in its closed position. Pressure of the locking handle against said plate provided on the garnish molding or the division bar has a tendency to spring the mounting bracket away from the window, frequently resulting in an unsightly and mechanically inadequate construction.

The above-described conventional sealing member when used for such pivotal windows is subject to the further disadvantage that the molded sealing members are not uniform in shape throughout their lengths. Pivotal windows conventionally are mounted for pivotal movement about a substantially vertical axis disposed at substantially the middle thereof. The lip or flange portions of the molded members at opposite sides of the pivotal axis are necessarily disposed at opposite sides of the window frame or channel. This means that each sealing member must be separately formed and molded in a time-consuming and relatively costly molding operation. In order to supply the large number of automobiles of the various types and styles produced, it is necessary for the manufacturer of such sealing members to maintain a large variety of costly molds. The sealing members at opposite sides of the automobile body are different because of the right and left swinging of the windows. Also, if provided for the rear windows, a different sealing member is required. Thus, as many as four different molds may be required to provide sealing strips for four locations for each car. Since the windows of different car models may be different in size and in some instances different in shape, it is seen that a variety of molds must be provided. The mold cost thus adds substantially to the cost of providing such sealing members.

Inevitable variations in manufacture and installation of such conventional sealing members are such that an imperfect seal frequently results. Due to the required placement of the overlying lips or flanges, the portion of the pivoted window rearward of its pivots is sealed only on the inside face of the window frame, or channel, and the portion of the pivoted window forward of its pivots is sealed only on the outside face of the window channel or frame. Thus, any imperfection in the sealing action of the lip or flange with the side of the window channel or frame permits leakage directly to the interior of the car. This is particularly troublesome when the pivoted window is closed and the car is driven in dust or rain storms, or is subjected to high water pressures as occurs when the car is washed.

The sealing member embodying the present invention preferably extends around the window opening at all points where it is desired to seal the window with such a member. In some instances, this includes a line extending from a point adjacent the divider bar at the top around the pivoted window opening and terminating at a point adjacent the divider bar at the bottom. The pivoted window turns about an axis which passes through the top and bottom pivots located as required to permit the desired opening and closing of the window. In some instances, these pivots are located approximately half-way in the length of the frame portions to which they are attached. In other instances, the pivots are located near one end of the pivoted window. In certain installations, the pivots for the pivoted window may be disposed at the side of the window frame so that the sealing member lies in the plane of the window opening. In other instances, the pivots may extend through the sealing bead. In either instance, when the pivoted window is moved from the open to the closed position the part of the periphery of the pivoted window frame in front of the pivot engages one side of the bead of the sealing member and rolls it outwardly and against the periphery of said frame. The part of the pivoted window frame behind the pivot engages the other side of the bead and rolls it inwardly and against the periphery of said frame. In each instance a continuous weather-tight seal is provided between the periphery of the pivoted window frame or channel and the fixed frame associated with the window opening.

The dimensions of the bead of the sealing member and the length of the neck connecting it to the base are such that when the pivoted window panel is closed the side of the bead with which the periphery of the panel frame engages comes substantially into the central plane of the member and one portion of the bead is distorted to abut against the base so that the bead is supported by the base against further angular movement. That part of the bead which is in contact with the periphery of the window frame or channel is compressed toward the base to make an effective seal with the periphery of the window frame or channel and a compressive force is exerted on the neck portion.

An important object of the present invention is, therefore, to provide an economical and effective weather seal which is particularly adapted to form a weather-tight seal between an opening and a closure pivotally mounted therein, and in which the sealing effect is achieved in a positive manner on the periphery of the closure without interfering with the pivotal opening movement of the closure member.

It is a further object of the present invention to provide a weather seal having a substantially uniform cross-sectional configuration throughout its length, which may be manufactured either by conventional extrusion processes or conventional molding processes.

It is another object of the present invention to provide a weather seal for a pivoted closure in which the unstressed sealing bead lies in the same plane as the plane of the transverse center line of the pivoted window when closed and is movable freely in either direction therefrom to generate a sealing contact with the periphery of said closure both forward and rearward of its pivots by bodily displacement of the sealing bead in response to the forces exerted thereon during the angular progressive closing movement of the said closure.

Another object of the present invention is to provide a weather seal of such standard form and dimensions that it can be readily adapted to seal all the pivotally mounted windows in an automobile body and which thus may be used as a standardized part to fit various models and makes of automobiles, thus minimizing the number of different sizes and shapes required and eliminating costly molds.

Another object of the present invention is to provide a weather seal of the above-mentioned character which makes possible the mounting of the window locking handle directly on the marginal frame or channel of the window, thus eliminating the special mountings or brackets heretofore required and the disadvantages attending the use thereof.

A further object of the present invention is to provide a weather seal for pivotally mounted windows which provides a neat, symmetrical, trim line and which provides a more effective weather seal than conventional molded sealing members heretofore used for the purpose.

The foregoing and other objects of the present invention are realized by the preferred embodiment of the present invention which consists of a resilient weather seal of continuous cross-sectional form consisting primarily of a mounting body, a sealing bead and flexible web-like neck connecting the sealing bead to the mounting body, the weather seal being so mounted in the window opening of a pivotally mounted window that, due to the progressive angular closing action of the window, the bead is caused to roll over or twist approximately 45° in the direction of closing movement of the window, thereby bringing one face of the sealing bead in contact with the periphery of the glass retaining frame or channel of the window and causing a sealing of the window on the periphery of the glass retaining frame or channel when the window is closed.

The contour of the bead of the sealing member is particularly designed to provide suitable sealing contacts with the periphery of the pivotally mounted window. A conventional type of such window channel or frame is formed with a radius on its periphery. For such channels or frames, the bead preferably is substantially cross-shape in cross sectional contour to provide a central longitudinal rib and spaced side arms disposed substantially at right angles on each side thereof. The longitudinal rib and the side arms taper from their outer edges to provide thicker portions at their central juncture point. The spacing and angular relationship between the side arms and the central longitudinal rib is determined by the dimensions and shape of the periphery of the window channel or frame. Other contours such as concave sided isoceles or equilateral triangles may also be employed. Also, other rectilinear forms may be used. The controlling factor in the choice of contour of the bead is that it should be such as to provide seating surfaces of sufficient width to establish weather sealing contact with the periphery of the window channel or frame.

Other objects of this invention will appear in the following description and appended claims, reference being had to the accompanying drawings forming a part of this specification, wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The preferred weather seal embodying the present invention as shown in the several views can be made of rubber, a resilient plastic, or any desired combination of suitable materials. Rubber or plastic elastomers have been found to be very satisfactory materials. The weather seal of the present invention may be molded but preferably is formed by conventional extrusion processes, as a weather seal produced in this manner possesses many properties superior to the properties of a molded product, and the extruded weather seal may be formed with substantially lower manufacturing costs due to the elimination of molds and faster production methods.

Figure 3:
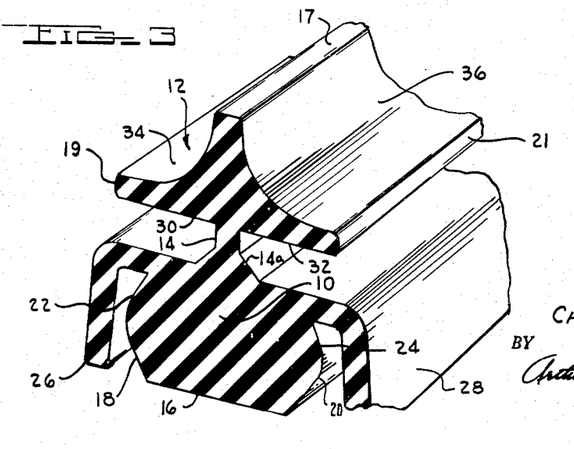
Fig. 3 is a view in perspective showing a fragmentary section of a weather seal embodying the present invention.
Figure 4:
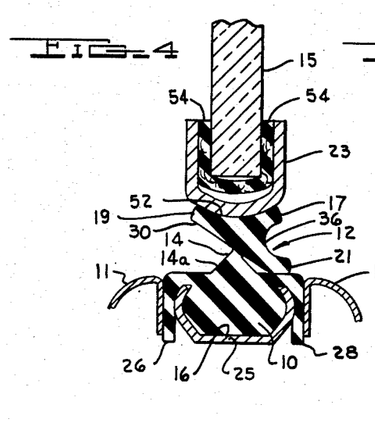
Figs. 4 and 5 are vertical sectional views in somewhat enlarged scale taken respectively on the lines 4—4 and 5—5 in the direction of the arrows of Fig. 1 and showing the positions of the weather seal bead at opposed sides of the bottom pivot of the pivotal window when the window is closed.
Figure 5:
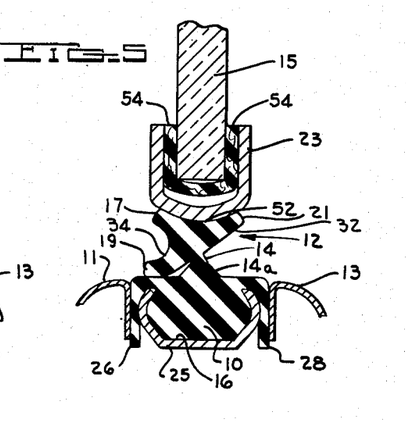

A weather seal embodying the present invention is shown in Fig. 3 and comprises a mounting portion 10 and a sealing bead 12 integrally connected with said mounting portion 10 by a flexible and resilient necklike web portion 14. These three parts of the strip are formed in one piece and the flexible neck or web 14 permits the sealing bead 12 to twist and roll bodily in either direction relative to the longitudinal center line of the mounting portion 10 in response to progressive angular movement of the pivoted window 15. The sealing bead 12 in its unstressed condition lies in the plane of the transverse center line of the pivoted window 15 when closed. When the pivoted window 15 is closed, the sealing bead 12 is stressed and as shown in Figs. 4 and 5 is rolled bodily to the right and to the left respectively (as viewed in the drawings) in response to the forces transmitted thereto by the pivoted window 15 in closing.

Figures 1, 2:
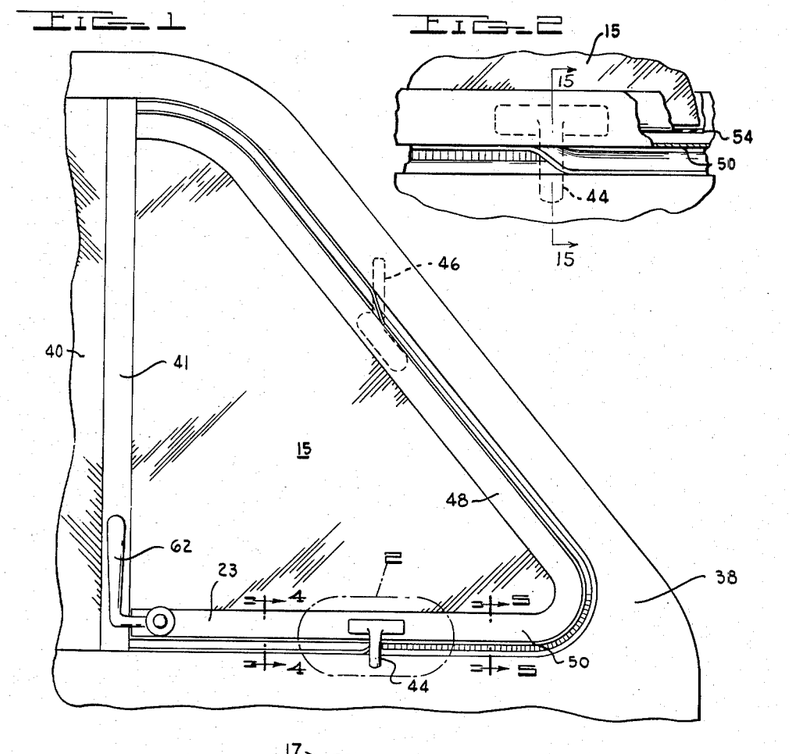
Fig. 1 is a fragmentary view of a portion of an automobile body door taken from inside the body and showing a portion of the window opening therein and a sliding window and a closed pivotal window mounted therein, and in which a weather seal embodying the present invention is provided in the clearance space between the periphery of the top, inclined edge and bottom of the pivotal window, and the adjacent portions of the window opening.
Fig. 2 is a fragmentary view in somewhat enlarged scale and partially in section taken from a point outside of the vehicle body and showing the lower pivot area indicated by the broken line, numeral 2.

The mounting portion 10 of the weather seal may assume a variety of forms, and the form used in any particular instance may vary, depending upon the structure of the window opening with which it is to be used and other factors found in actual practice. The exemplary strip shown in Figs. 1–5 and 9–14, inclusive, of the drawings is intended for use in a conventional automobile window construction having a pivotally mounted window 15. As shown in Figs. 1, 4 and 5, the window 15 is mounted in a window opening which is cased by the door panel window reveal molding 11 and the inner garnish molding 13. The sealing member is mounted in a channel 25 secured in the window opening between the reveal molding 11 and the garnish molding 13. The mounting portion 10 as shown in these views and in Fig. 3 is adapted particularly for use in such a conventional window structure. The mounting portion 10 has a flat bottom surface 16, upwardly divergent sides 18 and 20, and inturned top surfaces or shoulders 22 and 24. The shoulders 22 and 24 conveniently may extend inwardly toward the base of the neck 14. The weather seal shown is preferably provided with laterally extending flanges or skirt portions 26 and 28 which act as non-metallic, anti-rattle strips between the mounting channel 25, and the door panel window reveal molding 11 and between the mounting channel 25 and the inner garnish molding 13. In this particular form of the invention, the shoulders 22 and 24 extend inwardly for only a relatively short distance until they merge with the inner ends of the skirts 26 and 28.

Figure 8:
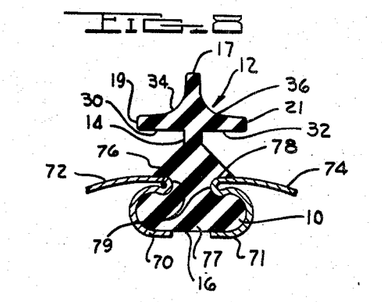
Fig. 8 is a sectional view showing still another modified sealing strip construction embodying the invention.

In specifically different mountings, as shown for example in Fig. 8, it may be desirable to change the design of the base and omit the skirts 26 and 28.

While the sealing bead 12 also may assume a variety of shapes, the substantially cross-like form shown in Fig. 3 has been found to be very practical. It may also take the form shown in Fig. 6. The sealing bead 12 shown in all the figures, except Fig. 6, comprises a cross-shaped element comprising the central rib 17 and side arms 19 and 21 spaced therefrom and angularly disposed one on each side of the central rib 17. As here shown, the rib 17 and the arms 19 and 21 are thickened near their common juncture point and merge to form a continuous curved surface which extends from the outer edge of each arm inward and upward to the outer edge of the central rib 17. The central rib 17 when the bead 12 is unstressed lies in the same plane as the transverse center line of the pivoted window 15 and extends inward from the window opening and lies in the path of the said windows for contact with the periphery of metal channel or frame 23 in which the glass panel of the pivoted window 15 is mounted.

As shown, the underside of the sealing bead 12 is joined substantially at its center line to the neck 14 so that the undersides 30 and 32 of the side arms 19 and 21 extend inwardly and merge into the neck 14 above the top surfaces of the skirts 26 and 28. The upper surfaces 34 and 36 of the side arms 19 and 21 extend inwardly toward the central rib 17 and merge into the curved outwardly flared lower portion thereof.

The central rib 17 and the side arms 19 and 21 as here shown constitute a double bell crank lever system in which the central rib 17 and the side arm 19 constitute one bell crank and the central rib 17 and the side arm 21 constitute the other bell crank. The common fulcrum for both bell cranks lies in the resilient neck 14. The neck 14 is provided with an outwardly flared base portion 14A which merges into and becomes a part of the base 10 of the weather sealing strip of the present invention. As here shown, the side arms 19 and 21 are each disposed substantially at right angles to the central rib 17. This is a preferred arrangement but other angular relationships may be employed if desired.

Figure 11:
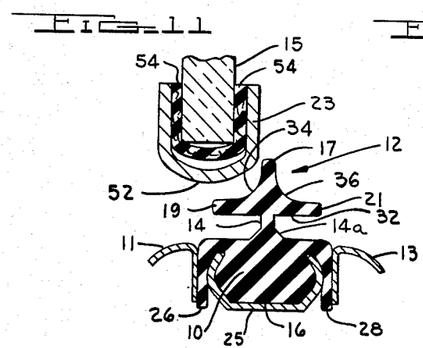
Figs. 11–13 inclusive are fragmentary sections taken substantially on the lines 11—11, 12—12 and 13—13 in the direction of the arrows of Fig. 9 showing the action of the sealing bead as the pivoted window pivots from the open position shown in Fig. 11 to a closed position shown in Fig. 13 and particularly indicating the manner in which the peripheral edge portion of the window frame engages and coacts with the sealing bead of the sealing member causing the sealing bead to roll or twist in the direction of closing thereby producing an efficient weathertight seal in the clearance space between the window and the window opening.
Figure 12:
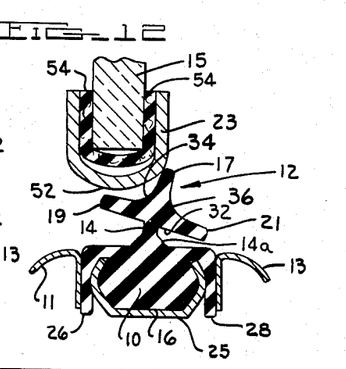
Figures 13, 14:
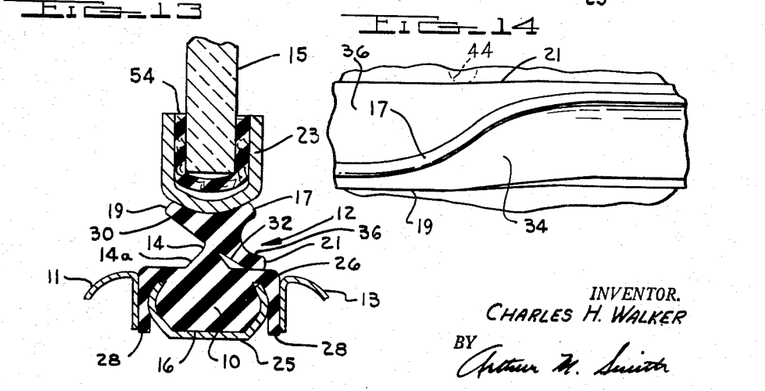
Fig. 14 is a top plan view of a portion of the weather sealing strip embodying the present invention with the pivotal window removed and showing the twisting action of the sealing bead on opposite sides of the window pivot.
Figure 15:
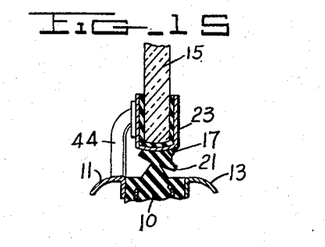
Fig. 15 is a vertical sectional view taken on line 15—15 in the direction of the arrows of Fig. 2.

The lever action of the rib 17 and the arms 19 and 21 is clearly shown in Figs. 11–13 inclusive. As there shown, the progressive angular contact of the metal channel or frame 23 with the central rib 17 during closing movement of the pivoted window 15 causes the entire bead 12 to pivot about the neck 14. This causes the arm 19 to be tilted upwardly into contact with the periphery of the channel 23. During further closing movement of the window 15, the central rib 17 acts as a lever pivoting about its fulcrum in the neck 14 and this pivoting action is translated to the side arm 21 which is tilted into engagement with the top of the base portion 10 and acts as a stop against further bodily tilting of the bead portion 12. Continued movement of the channel or frame 23 after the arm 21 reaches its stop position develops further resistance in the bead which exerts a pressure on the rib 17 and the arm 19 against the periphery of the channel or frame 23 when the final sealing position shown in Fig. 13 is reached. In this position, the entire bead 12 has been progressively tipped or rolled until the underside 30 of the rib 21 rests against the top of the shoulder portion 26 and the arm 19 contacts the periphery 52 of the glass channel or frame 23. During this movement, the bead 12 has also been subjected to a longitudinal twisting in the regions adjacent the window pivots 44 and 46 so that on the opposite side of the pivots, the positions of the arms 19 and 21 will be reversed from the positions shown in Figs. 11–13 inclusive. The rib 17 and the arms 19 and 21 when brought into tight weather sealing contact with the periphery of the channel or frame 23 thus establish an effective weather seal on both sides of the center line of the periphery of the window frame or channel 23.

It will be seen that the weather seal developed between the sealing bead 12 and the peripheral edge of the window frame or channel 23 provides a positive weather-tight seal which is effective to prevent leakage between the channel or frame 23 and the window opening when the pivoted window 15 is moved to its closed position.

The rib 17 and the arms 19 and 21 on the sealing bead 12 are so arranged that when the pivoted window 15 is closed, they are concealed between the periphery of the channel or frame 23 and the window opening. The only exposed part is a portion of the neck 14 which is a smooth surface and has no pockets or surface irregularities which might trap or hold water.

In order to illustrate the utility and practicability of the sealing strip, I have here shown the same associated with a vehicle door 38 having a sliding window 40 separated by a divider bar 41 from a pivotably mounted window 15. The door 38 as shown is a conventional automobile front door, and Fig. 1 illustrates the same as viewed from inside the body. The pivoted window 15 is mounted to turn about substantially vertical pivots 44 and 46, so that when opened, the forward or leading portion thereof can swing inwardly and the rearward or trailing portion thereof can swing outwardly of the vehicle body. The top and inclined forward edge 48 and the bottom edge 50 of the glass of the wing window 15 are reinforced by a metal channel or frame 23 (see Figs. 2, 4, 5, and 11–13) which fits over the top, inclined, and bottom marginal edge portions of the glass panel. A conventional type of glass retaining seal 54 is provided between the channel or frame 23 and the edge of the glass panel retained therein.

The weather seal of the present invention is mounted in the channel 25 secured to the interior door construction adjacent the periphery of the opening for the pivotally mounted window 15. The weather seal of the present invention is here shown extending along the top, inclined and bottom edges 48 and 50 of the said window with its end portions terminating adjacent the window divider bar 41. It will be readily appreciated, however, that the seal may be extended entirely around the window 15, if desired.

Specifically, as shown in Figs. 4 and 5, the mounting portion 19 of the weather seal is received in and confined by the channel 25 which comprises a part of the door structure. The channel 25 is so positioned that the sealing bead 12 of the weather seal extends into the window opening to engage progressively with the periphery of the channel or frame 23 of the pivoted window 15 as it is being closed. The skirt portions 26 and 28 are here shown folded downwardly over the side flanges of the channel 25 to provide anti-rattle buffers separating the latter from the outer door panel window reveal molding 11 and the inner garnish molding 13.

The seal is formed by contact of the bead 12 on the periphery 52 of the frame or channel 23 of the window 15 when the latter is fully closed (Figs. 1, 4 and 5). As shown in Figs. 4 and 5, when in use, the periphery 52 of the channel or frame 23 of the wing window 15 engages one side of the central rib 17 of the sealing bead 12 forwardly of the pivots 44 and 46 and the opposite side of the said central rib 17 rearwardly of the pivots. Thus, as the forward portion of the window is moved outwardly and the rearward portion thereof swings inwardly in closing, the sealing bead 12 is progressively twisted and rolled against the periphery 52 of the channel or frame 23 in such a manner that the side arms are tipped into position to form sealing contacts on both sides of the center line of the periphery of the frame or channel 23 as previously described.

Figures 9, 10:
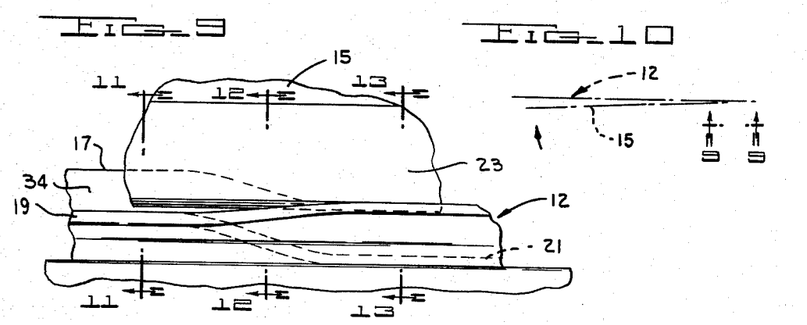
Fig. 9 is a fragmentary side elevation showing a portion of the pivoted window and illustrating its action on the sealing strip of the present invention in the area adjacent one of the window pivots.
Fig. 10 is a schematic view indicated by the broken lines of the pivotal angular movement of the pivoted window relative to the sealing strip of the present invention.

Figs. 11–13 taken with Figs. 9, 10 and 14, illustrate the bodily displacement of the bead 12 which occurs when the window 15 is turned from an open to a closed position. The channel or frame 23 of the pivoted window 15 simultaneously contacts opposite sides of the central rib 17 of the sealing bead 12 at points forward and rearward of the pivots. As the window 15 is moved further toward closed position, the frame 23 continues to contact the rib 17 on an angle and causes the bead 12 to be progressively rolled against the peripheral edge 52 of the frame 23 until the final closing action is completed. As shown, it will be apparent that the frame 23 first engages the central rib 17 of the sealing bead 12 adjacent the pivots 44 and 46 and that it thereafter progressively engages portions of the bead 12 of the weather seal forward and rearward of the pivots and displaces the bead 12 causing it to twist and roll into sealing position against the periphery of the channel or frame 23 during the closing action of the window 15. As the window closes, the frame or channel 23 rolls the sealing bead 12 against the periphery of the frame or channel 23, causing the portion 12 to seal the clearance space necessarily provided between the window frame 23 and the window opening. This action develops pressure against the bead 12 which is directed into the neck portion 14, and thus the neck 14 is subjected to compression forces and is not under tension when the window is closed.

The entire weather seal and the sealing bead 12 can be so designed as to make the sealing pressures relatively great or relatively slight. In any event, however, by the time the window 15 is moved to the fully closed position, the periphery 52 of the frame or channel 23 engages the sealing bead 12 and displaces the sealing bead 12 bodily to obtain sealing contact along the entire periphery of the window frame or channel 23.

It is a feature of this invention that the sealing bead 12 seals on the periphery of the window channel 23 as perhaps best shown in Figs. 4, 5 and 13. It does not extend onto the sides of the frame or channel 23 as do the lips of the conventional molded sealing strips heretofore used. As a consequence, the locking handle 62, with which pivoted windows of the type shown are conventionally equipped, can be mounted directly on the side face of the frame or channel 23 as shown in Fig. 1. There is ample room on the inner side flange of the frame or channel 23 to mount the latch 62 and its latching handle, and it is not necessary therefore to provide a special mounting bracket for the locking handle as must be done in the case of conventional molded sealing strips. As a consequence, expense in the building and mounting of the locking handle is reduced and a stronger, more practical locking action is accomplished. Since the weather seal of the present invention operates without lateral pressures against the frame or channel 23 to produce the sealing effect, it is apparent that locking action of the handle 62 and the closing of the window can be more easily accomplished and made more positive than in conventional constructions.

The weather seal here shown is suitable for the left and right front pivotal windows and also for the left and right pivotal rear windows of any automotive vehicle and can be used therefore as a standardized part for all makes and models of cars. The necessity of providing an especially designed weather seal for each window of the car and for different makes and models of cars has been thus eliminated by the particular form and construction of the weather seal here disclosed.

Figure 6:
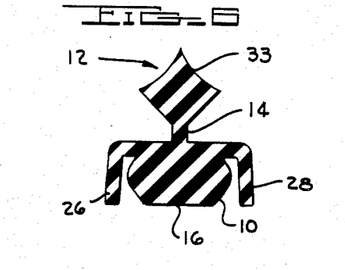
Fig. 6 is a sectional view showing a modified weather seal construction embodying the present invention.

The sealing bead 12 can be made in forms other than the cross-like form here shown. For example, a square or diamond-shaped sealing portion 33 disposed as shown in Fig. 6 may be used. The word "diamond-shaped" as used herein refers to a configuration substantially similar to that shown at 33 in Figure 6. Also triangular or other geometric forms may be employed. In using such other forms in which plane surfaces are present, it is desirable that such surfaces be slightly concave to provide better weather-tight sealing contacts with the periphery of the frame of the pivoted window.

Figure 7:
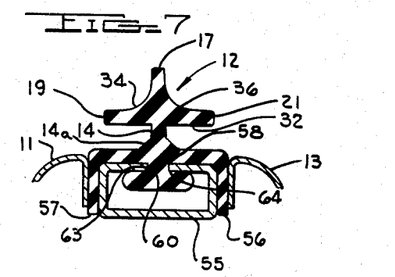
Fig. 7 is a sectional view showing another modified sealing strip construction embodying the invention.

In the modification of the base portion of the weather seal shown in Fig. 7, the window reveal molding 11 and the inner garnish molding 13 are spaced from the channel member 55 by the resilient skirt portions 56 and 57. The channel member 55 is provided with longitudinally extending channel opening 58. The weather seal as here shown comprises the sealing bead 12 as previously described which is joined to the neck portion 14. The neck portion 14 flares outwardly and downwardly on the opposite sides and merges into the base 60 which is provided with recesses 63 and 64 for engagement of the edges of the longitudinal opening 58. In this modification, the base 60 is pressed into place in the channel opening 58 and is held against displacement therefrom by the engagement of the recesses 63—64 with the edges of the longitudinal opening 58.

In the modification shown in Fig. 8, the retaining channel for receiving the weather seal is provided by the portion 70 which is formed as an integral part of the door molding 72 and a portion 71 which is an integral part of the interior trim molding 74. In this instance, the separate channel 25 is eliminated and the wings 26 and 28 also are eliminated from the base 10 of the weather seal. To retain the weather seal in the channel formed by the spaced portions 70 and 71 inwardly extending shoulders 76 and 78 are provided on the outer trim molding 72 and the inner trim molding 74, respectively. The neck portion 14 in this instance is flared outwardly at its base and joins the body portion of the base 77 to form longitudinally extending grooves 79 on each side of the base 77 which engage with the shoulders 76 and 78.

As shown in the several views, the neck 14 is thickened and flares outwardly at an angle adjacent its point of attachment to the top surface of the base 10 as indicated by the numeral 14A. This provides shoulders which prevent overstressing the neck 14 at points near the base 10. By this construction, the forces causing displacement of the bead 12 are distributed over the entire weather seal under pressure rather than in tension. This assures that the positive sealing of the window in the window opening can be effected without rupture of the neck 14 as might occur if it became overstressed in tension during the sealing action.

When the pivoted window is opened, the bead 12 due to its resilient properties returns to its initial unstressed position and thereafter occupies that position until movement of the window again displaces it and causes it to roll against and engage the periphery of the window as described above.

The weather seal of the present invention, as shown presents a neat symmetrical trim line when the window is open, as well as when the window is closed.

It will be apparent that the precise sizes and shapes of the sealing bead 12 will be determined with reference to the contour of the periphery 52 of the channel 23. Shown in the drawings is one conventional form of such frame or channel. As shown, it has a convex or slightly rounded peripheral surface. Other peripheral forms utilize triangular and rectangular or flat contours. The weather seal of the present invention will function efficiently with any of said forms of frames or channels. Also the clearance provided between the pivoted window and the window opening can vary within the permitted production limits without impairing the sealing action of the weather seal of the present invention.

From the foregoing, it will be seen that torsional forces are imposed on the sealing bead during the progressive angular closing action of the pivotally mounted window. These forces are sufficient to overcome the resistance of the sealing bead and cause it to twist. The resiliency of the bead and the neck together exert a counterforce to the twisting forces which attempt to return the parts to their unstressed positions. This causes the bead to exert a continual sealing pressure against the periphery of the frame of the pivoted window at all times until the displacing torsional forces are released upon opening of the window. This assures a positive weather tight sealing of the window when closed.

Having thus described my invention, I claim:

1. A continuous resilient sealing member of substantially uniform symmetrical cross-sectional shape made of a resilient plastic material for sealing the swinging pivotally mounted windows of an automotive vehicle when said windows are closed into the window openings, said sealing member consisting of a body for mounting in the window opening and a sealing bead connected to said mounting body by a flexible neck, said sealing bead being of such shape and of sufficient resiliency to progressively twist and roll against the periphery of the window during the closing thereof so as to form a positive seal between the periphery of the said pivotally mounted window on both sides of the center line thereof and the window opening and to return to its normal unstressed position when the window is open.

2. A resilient sealing member of continuous symmetrical cross sectional contour made of a resilient plastic material and adapted for mounting in a metal frame conforming to the contour of glass retaining channel of a swinging pivotally mounted ventilating window of an automotive vehicle, said sealing member comprising a base and a resilient bead connected therewith, said assembly being adapted for mounting in the window opening of said ventilating window to establish contact between the said resilient bead and the periphery of the said glass retaining channel of said window whereby said bead is rolled over and twisted progressively in opposite directions forward and rearward of the pivot points of said window during closing of said window to effect bodily displacement of said bead from its unstressed position and twisting and rolling it from its unstressed position against the periphery of the swinging window glass retaining channel, the contour and construction of said bead permitting said channel to progressively roll and twist the sealing bead during the progressive angular closing action of the window thereby producing a tight resilient seal between the periphery of the glass retaining channel on both sides of the center line thereof and the sealing bead when the window is closed.

3. A sealing member for use with a pivotal window having a frame thereon, comprising a continuous strip of resilient material of substantially uniform symmetrical cross sectional contour throughout its length and including a base for mounting the sealing strip, and a sealing bead connected with said base by a flexible web for bodily movement of said bead to establish weather tight sealing contact on both sides of the longitudinal center line of the periphery of the pivoted window frame or channel when the window is closed.

4. A weather seal for a pivoted window comprising a continuous weather sealing bead of a substantially uniform symmetrical cross-sectional contour mounted on a base for attachment in the window opening, and adapted to extend into the clearance space between the pivoted window and the window opening, and a flexible web connecting said bead and said base to make possible the bodily displacement of said bead relative to the longitudinal center line of said base in opposite directions forward and rearward of the window pivots in response to deflecting forces generated by the window in closing, said seal not interfering with the free-swinging of the pivoted window in the window opening while effecting the establishment of a positive seal at the periphery of the window when the window is swung to its closed position.

5. A weather seal as claimed in claim 4 and further characterized in that the entire weather seal is formed of an extruded resilient plastic material.

6. A weather seal as claimed in claim 4 and further characterized in that the said base is formed for mounting in a retainer channel provided adjacent the periphery of the window opening.

7. A weather seal as claimed in claim 4 and further characterized in that said bead is adapted to respond to compression forces to generate a weather tight seal by a change in its shape and said web is formed of resilient material so as to return said bead to its normal unstressed position upon release of deflecting forces.

8. A weather seal as claimed in claim 7 and further characterized in that said base is formed for mounting in a retainer channel provided adjacent the periphery of the said window opening and said base is provided with integral extending flanges adapted to provide a cushion between connected parts framing said window opening.

9. An automobile window construction of the type having a window opening and a window pivotally mounted in said opening, said window construction having in combination with said opening and with said window a sealing strip attached to said construction and extending along at least one side of said opening for engagement with the adjacent edge of said window, said sealing strip having a portion attached securely to said construction, and a sealing bead of substantially uniform symmetrical cross section disposed in the window opening for engagement with the periphery of said window and connected to the attached portion of the strip by a flexible neck which permits said sealing bead to roll bodily to either side of the longitudinal center line of said attached portion when engaged by said window during its closing movement.

10. A weather sealing member for providing a weather-tight seal between a closed pivotally mounted window and the window opening in which it is mounted, comprising a base for mounting in the window opening, a resilient bead extending longitudinally of said base and lying in a plane to establish contact with the periphery of said window during closing movement, said bead including separate transversely spaced sealing portions extending longitudinally thereof to provide weather sealing contacts on each side of the center line of the periphery of the pivotally mounted window when closed, and a continuous resilient neck extending longitudinally of said bead and connecting said bead and said base to permit bodily displacement of said bead during the progressive angular closing movement of the pivotally mounted window for establishing weather sealing contact with the periphery of the closed pivotally mounted window.

11. A weather sealing member for providing a weather-tight seal between a closed pivotally mounted window and the window opening in which it is mounted, comprising a base for mounting in the window opening, a resilient bead extending longitudinally of said base and lying in a plane to establish contact with the periphery of said window during closing movement, said base being of substantially an inverted T-shape in cross section, one-half the cross bar and the main stem of the T providing weather sealing contacts on each side of the center line of the periphery of the pivotally mounted window when closed, and a continuous resilient neck extending longitudinally of said bead and connecting said bead and said base to permit bodily displacement of said bead during the progressive angular closing movement of the pivotally mounted window for establishing weather sealing contact with the periphery of the closed pivotally mounted window.

12. A sealing strip of elastomeric material comprising an attaching body portion, a flexible neck portion extending from said body portion, and a sealing bead of symmetrical substantially diamond-shaped cross section affixed at one corner thereof to said neck portion, the opposite corner of said bead extending away from said neck portion and being bordered on each side by concave sealing surfaces.

References Cited in the file of this patent

UNITED STATES PATENTS

| Number | Name | Date |
|---|---|---|
| 2,606,059 | Wernig | Aug. 5, 1952 |

FOREIGN PATENTS

| Number | Country | Date |
|---|---|---|
| 634,860 | Germany | Sept. 5, 1936 |